(12) United States Patent
Liu et al.

(10) Patent No.: US 10,977,005 B2
(45) Date of Patent: Apr. 13, 2021

(54) CONGNITIVE DEVELOPMENT OF DEVOPS PIPELINE

(71) Applicant: International Business Machines Corporation, Armonk, NY (US)

(72) Inventors: Xiao Xi Liu, Beijing (CN); Jing Min Xu, Beijing (CN); Yuan Wang, Beijing (CN); Jian Ming Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 581 days.

(21) Appl. No.: 15/622,558

(22) Filed: Jun. 14, 2017

(65) Prior Publication Data
US 2018/0364985 A1    Dec. 20, 2018

(51) Int. Cl.
*G06Q 10/06* (2012.01)
*G06F 8/10* (2018.01)
(Continued)

(52) U.S. Cl.
CPC .................. *G06F 8/10* (2013.01); *G06F 8/36* (2013.01); *G06F 11/3664* (2013.01);
(Continued)

(58) Field of Classification Search
CPC . G06F 11/368; G06F 8/10; G06F 8/70; G06F 8/36; G06Q 10/06
(Continued)

(56) References Cited

U.S. PATENT DOCUMENTS 9,378,242 B1 * 6/2016 Fontenot ............... G06F 16/332
9,411,702 B2   8/2016 Eilam et al.
(Continued)

FOREIGN PATENT DOCUMENTS

EP     2783284       10/2014
WO     2015112170    7/2015

OTHER PUBLICATIONS

Chen, F., Deng, P., Wan, J., Zhang, D., Vasilakos, A. V., & Rong, X. (2015). Data mining for the internet of things: Literature review and challenges. International Journal of Distributed Sensor Networks, 431047 (14 pp.). doi:http://dx.doi.org/10.1155/2015/431047 (Year: 2015).*

(Continued)

*Primary Examiner* — Folashade Anderson
(74) *Attorney, Agent, or Firm* — Fleit Intellectual Property Law; Jon Gibbons

(57) ABSTRACT

A service running on a server for developing software collaboratively. The service includes accessing at least one repository of code for software applications. A code tree structure is extracted from the repository which represents a plurality of preexisting pipeline requirements to be used with a tree kernel similarity algorithm. At least one development repository of code is accessed. A code tree structure is extracted from the development repository of code which represents a new pipeline requirement to be used with a tree kernel similarity algorithm. A tree kernel similarity algorithm is used that includes a specified similarity function to create feature map between the new pipeline requirements with the preexisting pipeline requirements. One or more features of the new pipe line requirements are clustered. Different requirements are extracted to different definitions based upon the features that have been clustered. A preexisting pipeline requirement is selected for a highest similarity.

20 Claims, 10 Drawing Sheets

(51) Int. Cl.
*G06F 8/36* (2018.01)
*G06F 11/36* (2006.01)
*G06F 8/70* (2018.01)

(52) U.S. Cl.
CPC .............. *G06Q 10/06* (2013.01); *G06F 8/70* (2013.01); *G06F 11/368* (2013.01)

(58) Field of Classification Search
USPC ........................................................ 705/7.42
See application file for complete search history.

(56) References Cited

U.S. PATENT DOCUMENTS

| | | | | |
|---|---|---|---|---|
| 2003/0110150 | A1* | 6/2003 | O'Neil | G06F 16/86 |
| 2003/0236661 | A1* | 12/2003 | Burges | G06K 9/4647 |
| | | | | 704/205 |
| 2004/0216045 | A1* | 10/2004 | Martin | G06F 8/10 |
| | | | | 715/255 |
| 2006/0004528 | A1* | 1/2006 | Uehara | G06F 8/71 |
| | | | | 702/20 |
| 2006/0271843 | A1* | 11/2006 | Yarde | G06F 40/14 |
| | | | | 715/234 |
| 2007/0028213 | A1* | 2/2007 | D'Alo | G06Q 10/06 |
| | | | | 717/120 |
| 2007/0168946 | A1* | 7/2007 | Drissi | G06F 8/71 |
| | | | | 717/110 |
| 2007/0234316 | A1* | 10/2007 | Bayerlein | G06F 8/71 |
| | | | | 717/140 |
| 2009/0024555 | A1* | 1/2009 | Rieck | G06F 7/02 |
| | | | | 706/54 |
| 2009/0234869 | A1* | 9/2009 | Azvine | G06F 16/211 |
| 2009/0276396 | A1* | 11/2009 | Gorman | G06F 40/30 |
| 2009/0276757 | A1* | 11/2009 | Lindvall | G06F 8/72 |
| | | | | 717/121 |
| 2012/0324353 | A1* | 12/2012 | Torbey | G06F 3/048 |
| | | | | 715/716 |
| 2014/0067769 | A1* | 3/2014 | Sugawara | G06F 16/215 |
| | | | | 707/687 |
| 2014/0180881 | A1* | 6/2014 | Krueger | G06Q 10/06 |
| | | | | 705/28 |
| 2017/0264749 | A1* | 9/2017 | Wu | H04M 15/58 |
| 2018/0012181 | A1* | 1/2018 | Blincoe | G06Q 10/101 |
| 2020/0159950 | A1* | 5/2020 | Bodin | G06Q 10/10 |

OTHER PUBLICATIONS

Altarawy, D., Shahin, H., Mohammed, A., & Meng, N. (2018). Lascad : Language-agnostic software categorization and similar application detection. Journal of Systems and Software, 142, 21-34. doi:http://dx.doi.org/10.1016/j.jss.2018.04.018 (Year: 2018).*

Zavadia, S., "Steps to Creating an Effective Devops Focused Deployment Pipeline", Sep. 15, 2016, http://www.getzephyr.com/insights/steps-creating-effective-devops-focused-deployment-pipeline, pp. 1-6.

* cited by examiner

```
{
  "language" : "objective-c",
  "osx_image" : "xcode7",
  "xcode_sdk" : "iphonesimulator9.6",
  "cache" : {
    "directories" : [
      "node_modules",
      "ios/Pods",
      "~/.nvm"
    ]
  },
  "before_install" : [
    "export NVM_DIR=~/.nvm",
    "which nvm || curl -o- https://raw.githubusercontent.com/creationix/nvm/v0.29.0/install.sh
    "source ~/.nvm/nvm.sh --install",
    "nvm install 4.2.3",
    "brew update",
    "brew reinstall xctool",
    "brew reinstall watchman",
    "npm install",
    "gem install xcpretty",
    "gem install cocoapods",
    "pod install --project-directory=ios"
  ],
  "before_script" : [
    "npm run compile:test"
  ],
  "script" : [
    "npm test"
  ],
  "group" : "stable",
  "dist" : "osx",
  "os" : "osx"
}
```

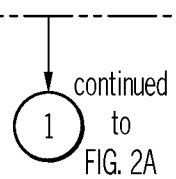

CONGNITIVE DEVELOPMENT OF DEVOPS PIPELINE

BACKGROUND

The present invention generally relates to services, and more particularly to providing services for developing software collaboratively with a DevOps pipeline.

Nowadays, more and more application developers and operators begin to embrace DevOps method and practice, which emphasizes the collaboration and communication of among them while automating the process of software delivery and infrastructure changes. In practice, an important component of DevOps is to establish a pipeline to cover and automate the tasks including package, build, test, deployment and monitoring the application, but design and implement such pipeline is not a trivial work, it's usually need high skill level for DevOps related technology and deep understanding of application development and operation environment, this is often a big overhead for a team to practice DevOps.

To simplify the DevOps pipeline establishing, there are several existing tools and services which can be categorized into two groups as follows:
1. The first group of tools provides a low level programmable capability to enable end user define and develop their DevOps pipeline. An example of this type of tool is Jenkins. These tools provide all kinds of options and plug-ins and customization points for end user to define and writing their own DevOps code, so it can be used to implement very sophisticated pipeline, but it also need the high level and sophisticated skills.
2. The second group of tools and services provides a template based pipeline system. These templates include requirement points to the end user, and end user can establish the pipeline by set up these requirement points. This type of tools or services are more consumable than the first group but could not cover all requirements and scenarios since it's based on a fix template.

SUMMARY

One embodiment of a service is a computer-implemented method. The method includes running on a server, for example as a cloud server. The method provides services for developing software collaboratively. The method includes accessing at least one repository of code for software applications. A code tree structure is extracted from the repository which represents a plurality of preexisting pipeline requirements to be used with a tree kernel similarity algorithm. At least one development repository of code is accessed. A code tree structure is extracted from the development repository of code which represents a new pipeline requirement to be used with a tree kernel similarity algorithm. A tree kernel similarity algorithm is used. The tree kernel similarity algorithm includes a specified similarity function to create feature map between the new pipeline requirements with the preexisting pipeline requirements. One or more features of the new pipe line requirements are clustered. Different requirements are extracted to different definitions based upon the one or more features that have been clustered. A preexisting pipeline requirement is selected for the feature map with a highest similarity of features.

The pipeline selected is a continuous integration (CI) and continuous development (CD) used in a DevOps environment. The extracting a first code tree structure from the repository which represent preexisting pipeline requirements to be used with a tree kernel similarity algorithm is extracted either on a periodic time bases or in response to new code for software applications being made available in the repository.

In one embodiment, the extracting a first code tree structure from the repository which represent preexisting pipeline requirements and the extracting a second code tree structure from the development repository of code which represent the new pipeline requirement to be used, includes extracting with a tree kernel similarity algorithm one or more of a language type extractor, a build tool extractor, a deployment environment extractor, and a test tool extractor.

Other embodiments of the invention include a system and a computer program product.

BRIEF DESCRIPTION OF THE DRAWINGS

The accompanying figures wherein reference numerals refer to identical or functionally similar elements throughout the separate views, and which together with the detailed description below are incorporated in and form part of the specification, serve to further illustrate various embodiments and to explain various principles and advantages all in accordance with the present invention, in which:

FIG. 2A through FIG. 2C is an example of FIG. 1 as a DevOps Pipeline using Travis for continuous integration, Jenkins for an automation server, and Docker Cloud for deployment;

DETAILED DESCRIPTION

Figure 1:
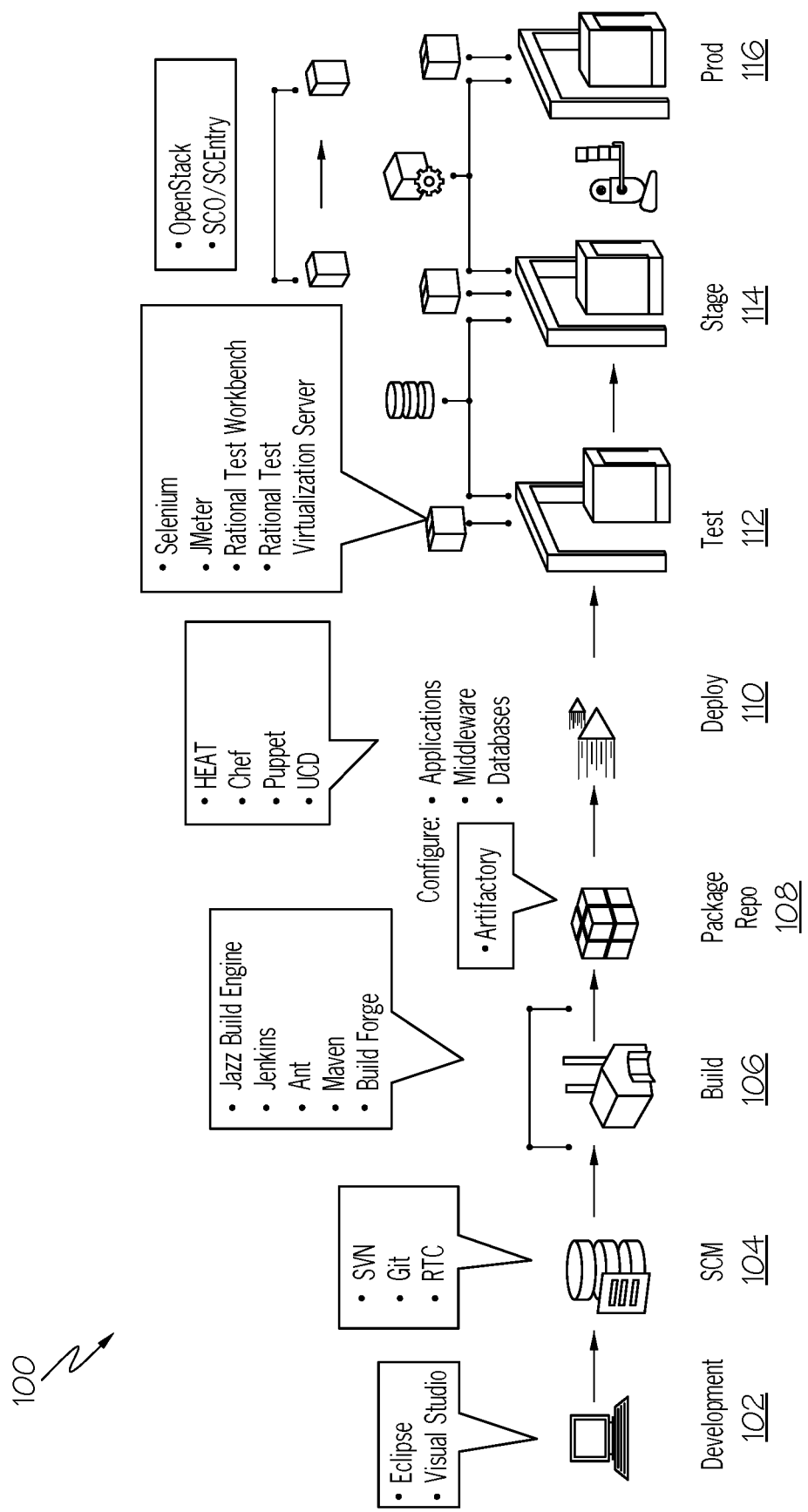
FIG. 1 is an example DevOps Pipeline, in accordance with an embodiment of the present invention.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The description of the present invention is presented for purposes of illustration and description, but is not intended to be exhaustive or limited to the invention in the form(s) disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. The terminology used herein is for the purpose of describing particular embodiments only and is not intended to be limiting of the invention.

The present invention provides an automatic method to extract the DevOps pipeline requirements from end user's code repository. The invention maps a huge amount of the existing public code repository with the related public CI/CD requirement/code. Next the similarity of the DevOps pipeline requirements with the existing project's pipeline requirement is compared. A search is made to compose a new pipeline requirement/code for the end user from the existing pipeline requirement/code.

Aspects of the present invention includes a new system and method to enable end user develop DevOps pipeline in a consumable way and keep the flexibility at the same time. This new system includes mainly two sub-systems, the first sub-system will collect existing DevOps pipeline data, including pipeline data from public DevOps service such as Travis, a Jenkins plug-in, community data, and perform semi-supervised machine learning to group all the existing pipeline into some types and find out the features of these types; the second sub-system will extract templates from these pipeline types and generate requirement wizard based on these templates and features, and end users can use these wizard to establish his own pipeline. The present invention provides the end user with template and wizard based DevOps pipeline build system but keep the capability to fit different requirements at the same time.

This new system includes mainly two sub-systems:

(1) The first subsystem is a template and pipeline features build system. This first subsystem:
   (a) collects existing pipeline data
   (b) performs semi-supervised machine learning to group all the existing pipeline into some types and find out the features of these types
   (c) extracts templates from these pipeline types (2) The second subsystem is a pipeline wizard system. The second subsystem:
   (a) generates requirement wizard based on these templates and features got from the first system
   (b) builds and runs the DevOps pipeline based on the end user input collected through the wizard.

The present invention solves the problem of both designing and implementing a DevOps pipeline. The present invention saves time and reduces the required high skill level for DevOps related technology. This high skill level requires a deep understanding of application development and operation environment. This high skill level is typically a large overhead in the practice of DevOps.

Design and implement a high efficiency pipeline is a sort of "art", so if developer can leverage and reuse some best practice, experience or even code snippet to fit his/her environment and requirements, it will increase the pipeline quality and accelerate the development process.

The terms "a", "an" and "the" are intended to include the plural forms as well, unless the context clearly indicates otherwise.

The term "build tools" means programs used to automate the creation of executable applications from source code. Building incorporates compiling, linking, and package the code into a usable or executable form. Example of Building tools include Ant, Maven, Gradle, NAnt, MsBuild, Waf just to name a few.

The term "code tree structure" is an ordered, rooted tree that represents the structure of software code.

The terms "comprises" and/or "comprising", when used in this specification, specify the presence of stated features, steps, operations, elements, and/or components, but do not preclude the presence or addition of one or more other features, integers, steps, operations, elements, components, and/or groups thereof.

The term "deployment environment" is a collection of configured clusters, servers, and middleware that collaborate to provide an environment to host software modules. For example, a deployment environment might include a host for message destinations, a processor or sorter of business events, and administrative programs. In simple cases, such as developing and immediately executing a program on the same machine, there may be a single environment, but in industrial use the development environment (where changes are originally made) and production environment (what end users use) are separated; often with several stages in between.

The term "language type" means a computer programming language such a C, C #, Java, Java Script, Assembly and others.

The term "repository of code" means a version control repository typically offering distributed version control and management functionality Examples include GitHub, Git, Subversion, Mercurial, WebDAV and Deveo. The repository can be a public or private or subscription based service. The repository can be used for preexisting code as well as for development repository for new code.

The term "test tool" means is software, both free and licensed, to provide an objective, independent view of the software to allow the business to appreciate and understand the risks of software implementation. Test techniques include the process of executing a program or application with the intent of finding software bugs, and verifying that the software product is fit for use.

The term "tree kernel similarity algorithm" is a class of algorithms used in machine learning for finding different types of relations between code tree structures including clusters, ranking, principal components, correlations and classifications using a user-specified similarity function.

As described by Wikipedia, DevOps is a clipped compound of "software DEVelopment" and "information technology OPerationS." DevOps is a term used to refer to a set of practices that emphasize the collaboration and communication of both software developers and information technology (IT) professionals while automating the process of software delivery and infrastructure changes.

Nowadays, more and more application developers and operators begin to embrace DevOps method and practice, which emphasizes the collaboration and communication of among them while automating the process of software delivery and infrastructure changes.

In practice, the most important work of DevOps is to establish a pipeline to cover and automate the tasks including package, build, test, deployment and monitoring the application.

FIG. 1 is an example DevOps toolchain or DevOps Pipeline 100, in accordance with an embodiment of the present invention.

Shown is a simplified development environment 102 as a single system. It should be understood that the deployment environment can include a collection of configured clusters, servers, and middleware that collaborate to provide an environment to host software modules. Example of a development environment 102 includes Eclipse and Microsoft Visual Studios.

Next in the DevOps Pipeline is SCM 104. SCM or Software Requirement Management is a software version control and management system or code repository. SCM tracks changes in the software. The code repository is used for tracking changes in computer files and coordinating work on those files among multiple people. It is primarily used for software development, but it can be used to keep track of changes in any files. As a distributed revision control system it is aimed at speed, data integrity, and support for distributed, non-linear workflows. Example of a code repository include Git, and Subversion.

Next in the DevOps Pipeline are build tools 106 used to programs used to automate the creation of executable applications from source code. Building incorporates compiling, linking, and package the code into a usable or executable form. Example of Building tools include Jazz Build, Jenkins, Ant, Maven, Build Forge.

Next in the DevOps Pipeline is a software repository or a package repository 108 is a software repository is a storage location from which software packages may be retrieved and installed on a computer. Examples of package repositories include CTAN, Ruby, and CRAN.

Next in the DevOps Pipeline is a deployment manager 110. The deployment manager is an administration application that runs in a special application server. One example is WebSphere using the deployment manager profile template.

Next in the DevOps Pipeline is a test system 112 is a repository a level of the software testing where a complete and integrated software is tested. The purpose of this test is to evaluate the system's compliance with the specified requirements. Examples include Agile, TestFLO, Test Collab and more.

Next in the DevOps Pipeline is a stage 114. A stage is used to verify a quality of new features in the new version of code. Stages include plan, create, verify, preproduction, release, configure, monitor.

Figure 2A:
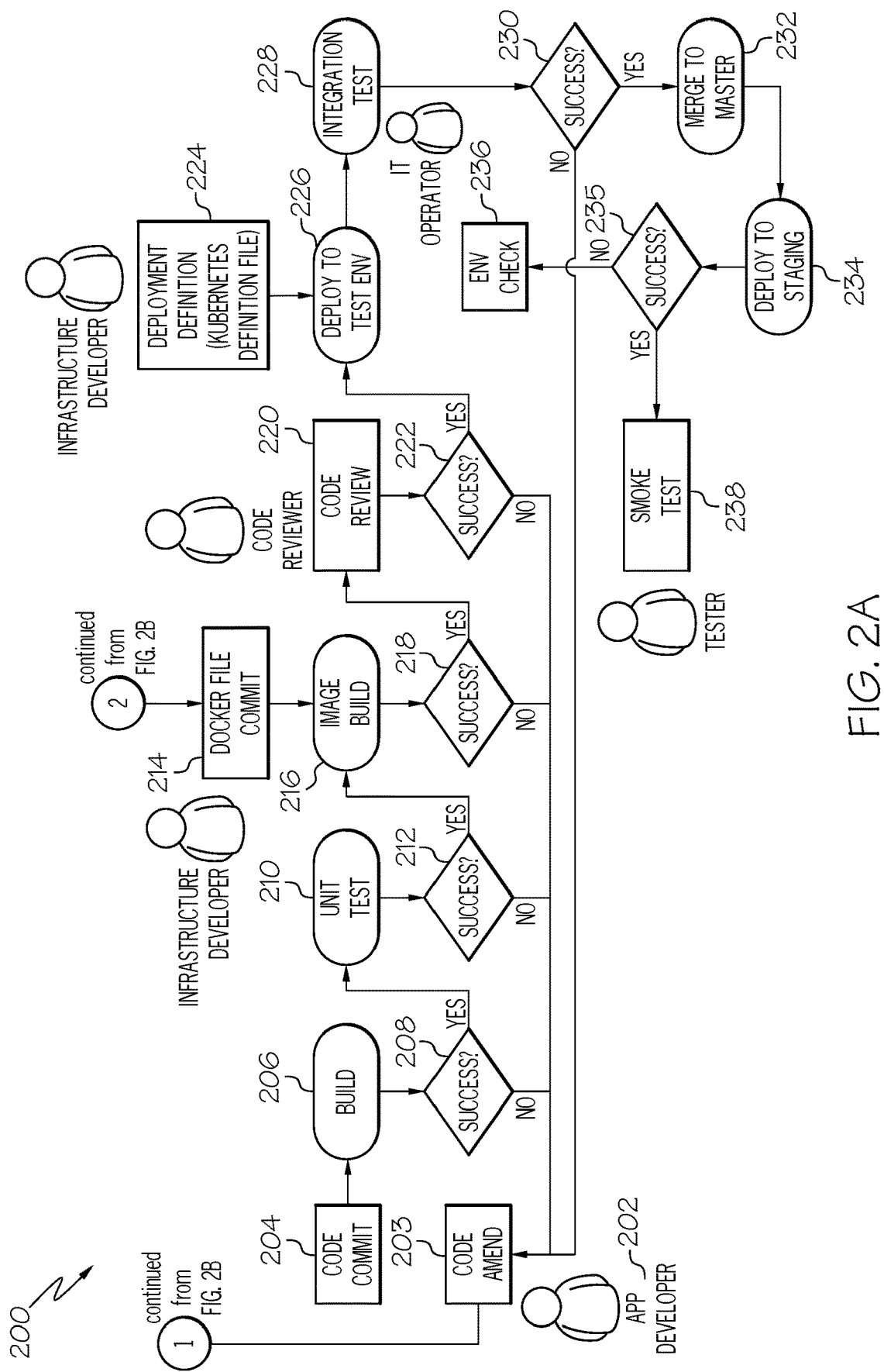
Figure 2C:
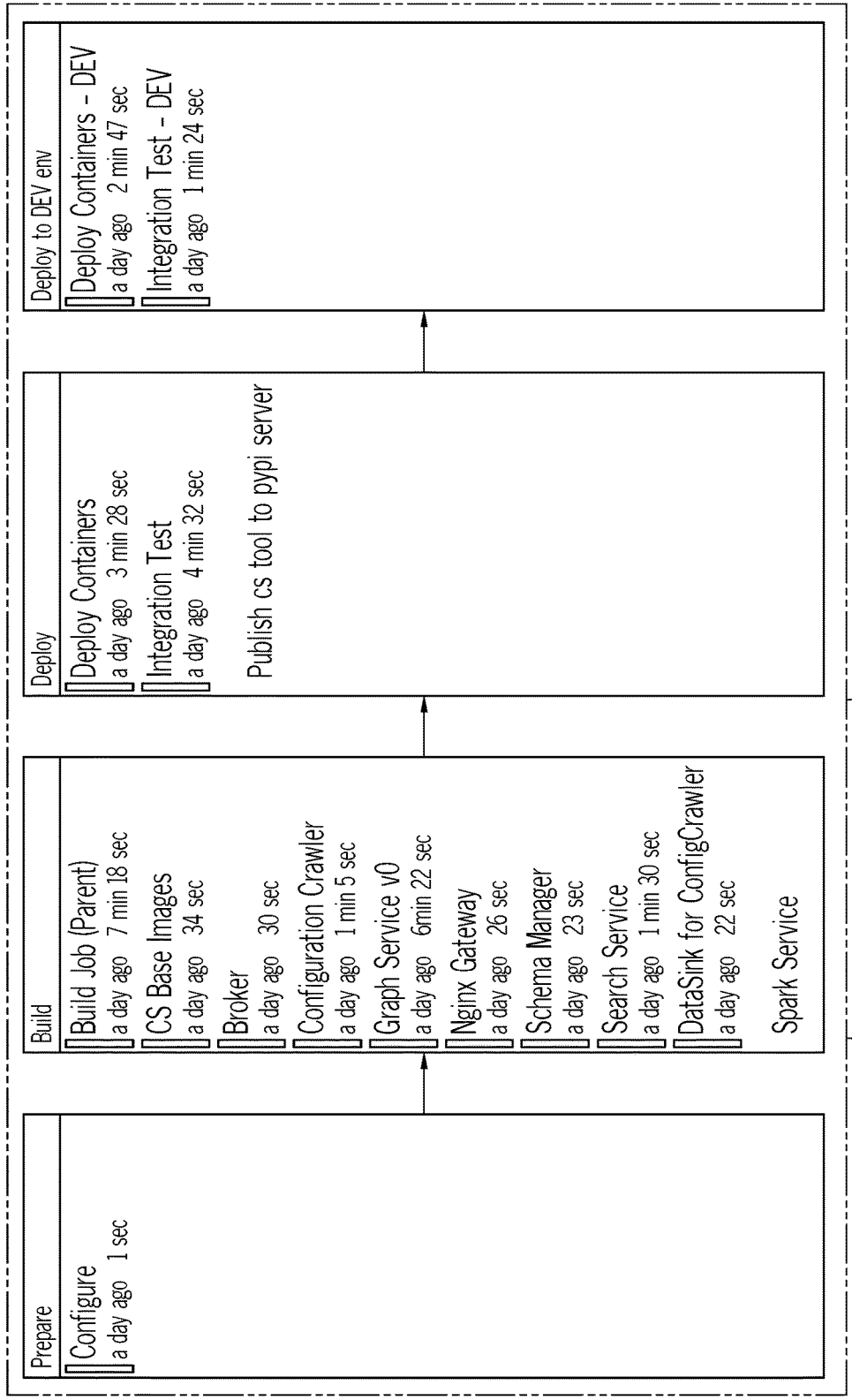

The final portion of the DevOps Pipeline is a product 116. The final tested version of new software code developed. Example DevOps Pipeline Using Travis, Jenkins and Docker Cloud FIG. 2 is an example 200 of FIG. 1 as a DevOps Pipeline using Travis for continuous integration, Jenkins for automation server, and Docker Cloud for deployment, in accordance with an embodiment of the present invention.

In this example a developer 202 is updating code 203 for iPhone application and commits the code 204. The code is built 206. A test for errors is made 208. If there are errors the process returns to developer in step 202 Otherwise, the process continues to a unit test 210 in which individual units of source code modules are tested together. A test for errors is made 212. If there are errors with the unit test is the process returns to the developer in step 202. Otherwise the process continues to image build in which other units are retrieved from other developers 214 and image build 216. A test for errors is made 218. If there are errors the process returns to the developer in step 202. Otherwise the process continues to step 220. In this Docker example the image is an inert, immutable file that is a snapshot of a container. SCM 200 is illustrating a dev trigger.

Code review 220 the code is examined, typically by a peer, to find mistake overlooked in the initial development phase. A test for errors is made 222. If there are errors with the code review by code reviewer unit test is the process returns to the developer in step 202. Otherwise the process continues to deployment to test environment 226 with deployment definition 224 to test the newly build software product in which individual software modules are combined and tested as a group in step 228. As shown, if there are errors, in test 230, the process returns to the developer in step 202. Otherwise the process continues to step 232 merge to master as shown. The process continues to step deploy to staging 234. A test for errors is made 228. If there are errors, in test 235, the process returns to the environmental check 236. Otherwise the process continued to smoke test 238.

Figure 3:
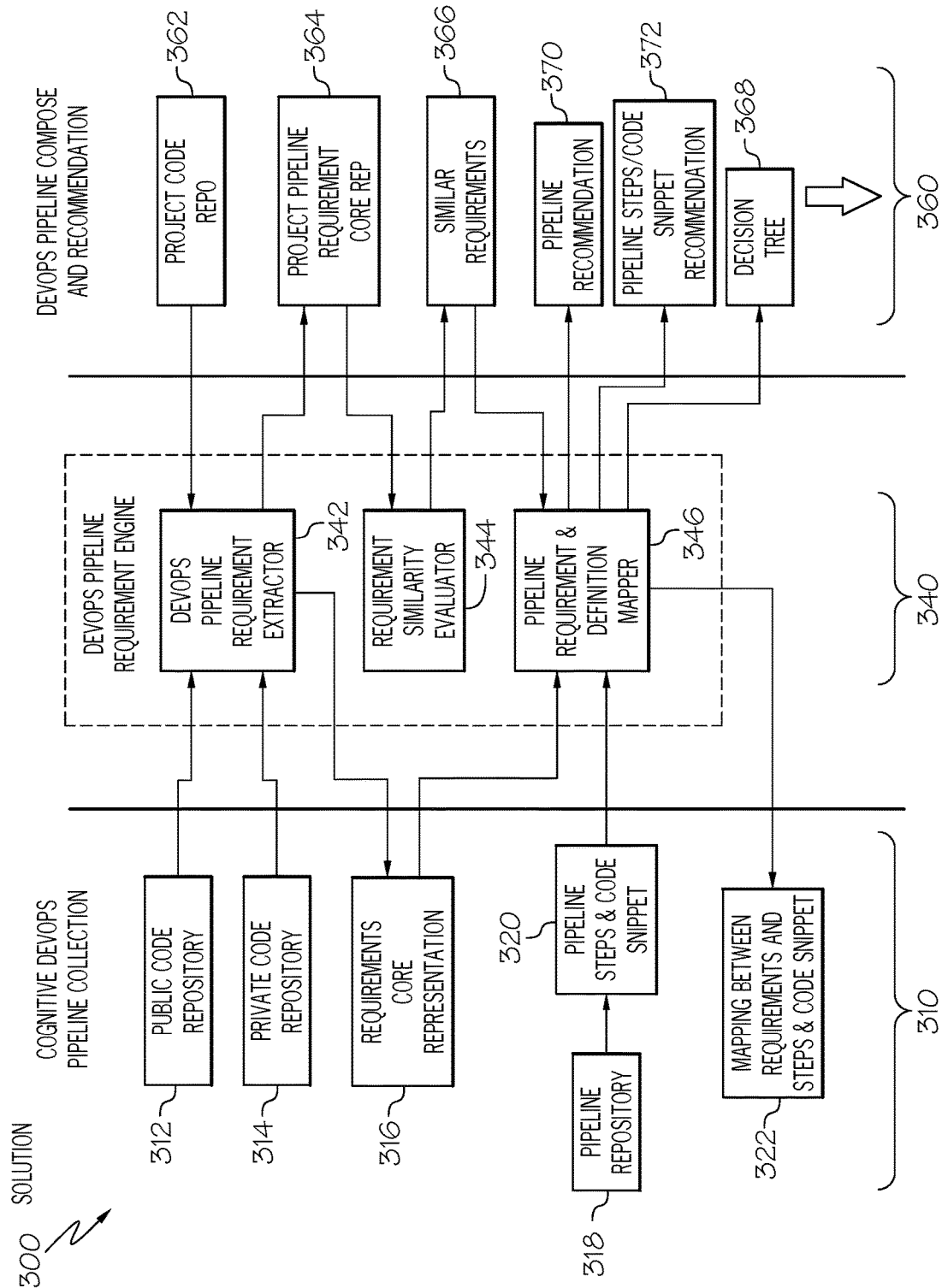
FIG. 3 is a functional diagram illustrating method used to develop software, in accordance with an embodiment of the present invention.

FIG. 3 is a functional diagram illustrating method used to develop software, in accordance with an embodiment of the present invention. This diagram is divided into three major sections as follows: i) cognitive DevOps Pipeline Collection 310, ii) DevOps Pipeline Requirement Engine 340, and iii) DevOps Pipeline Compose and Recommendation 360. There are separate flows for each of these three major sections.

Turning to the cognitive DevOps Pipeline Collection 310 one or more code repositories are accessed. This example illustrates both a public code repository 312 and a private code repository 314 being accessed. Each of these pipelines contains preexisting code. In step 316 a first code tree structures are extracted from the public code repository 312 and a private code repository 314. This builds a pipeline repository 318 of code tree structures that have been extracted. This pipeline repository represents steps in a DevOps pipeline for particular snippets of code 320. This mapping between the first code tree structure with steps and code snippets is stored in step 322.

In one example this cognitive DevOps Pipeline Collection 310 is running as a cloud service. The steps above can be repeated on a settable time period. Or in another example, the steps above are repeated in response to new code being deposited into the public code repository 312 or the private code repository 314.

The DevOps Pipeline Requirement Engine 340 acts as a coordinator between the Cognitive DevOps Pipeline Collection 310 and the DevOps Pipeline Compose and Recommendation 360. This coordination will be described along with the DevOps Pipeline Compose Recommendation 360.

Figure 4:
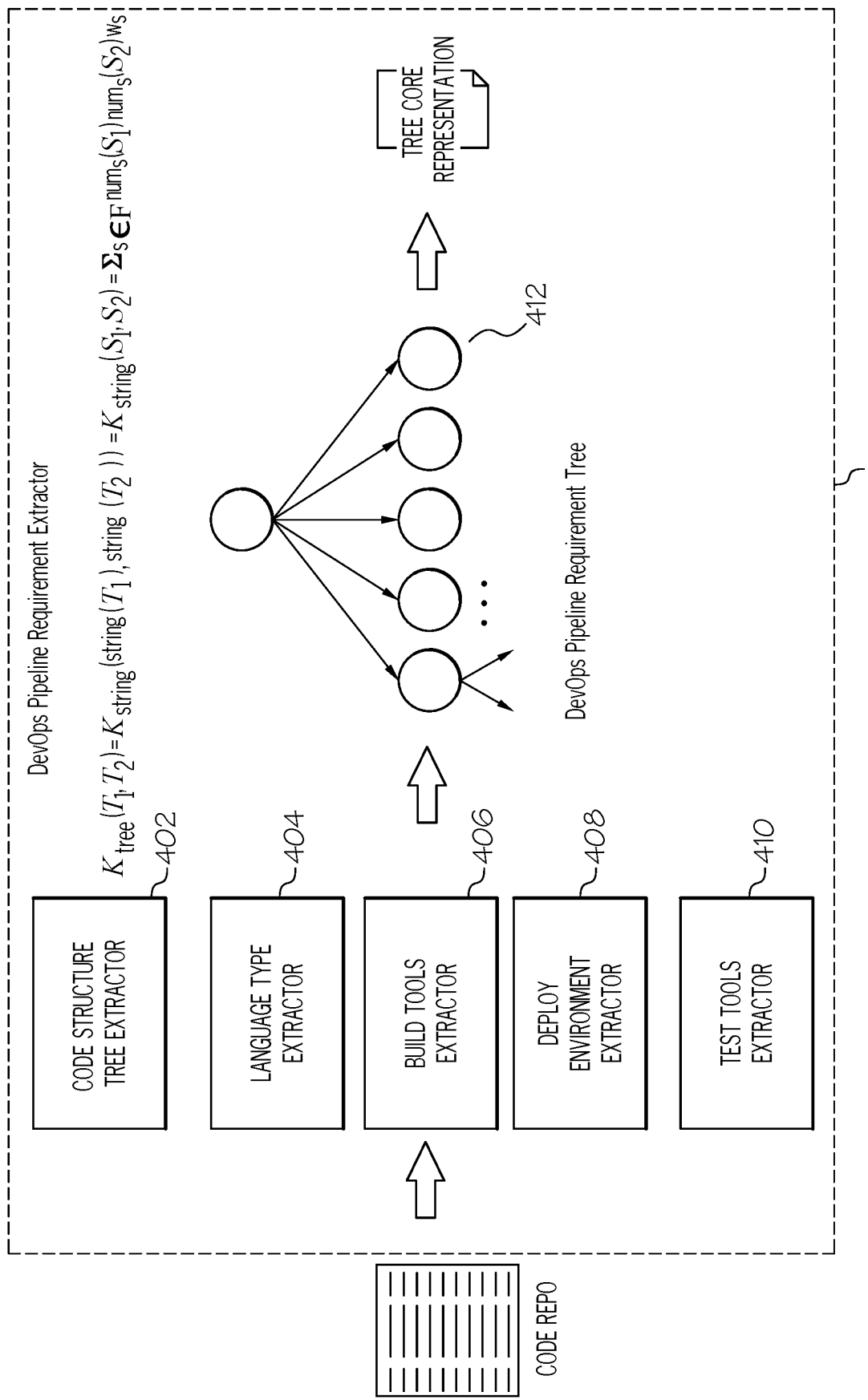
FIG. 4 is a flow diagram illustrating, in accordance with an embodiment of the present invention.

The process begins with project code repository being accessed in step 362. The development or project code repository 362 contains requirements for new code. In step 342 a second code tree structure is extracted from the project code repository 312 and a private code repository 314. This builds a pipeline requirement repository 364 of code tree structures that have been extracted. The requirements used in step 342 are shown in FIG. 4. These include one or more of code tree structure extractor 402, language type extractor 404, build tools extractor 406, deployment environment extractor 408, and text tools extractor 410. These produce the DevOps pipeline Requirement Tree 412. The DevOps pipeline Requirement Tree 412 is composed by the various requirements which are captured by the above extractors 402, 404, 408 and 410. In the DevOps pipeline Requirement Tree 412, each node denotes a requirement point of the DevOps pipeline, and the requirement is described by the label of the node. The hierarchy of the DevOps pipeline Requirement Tree 412 represents the different level of details of the requirements, nodes in the same level denotes different aspects of requirement in some detail level, and the children nodes denotes more detail requirements under the requirement point represented by the parent node.

Figure 5:
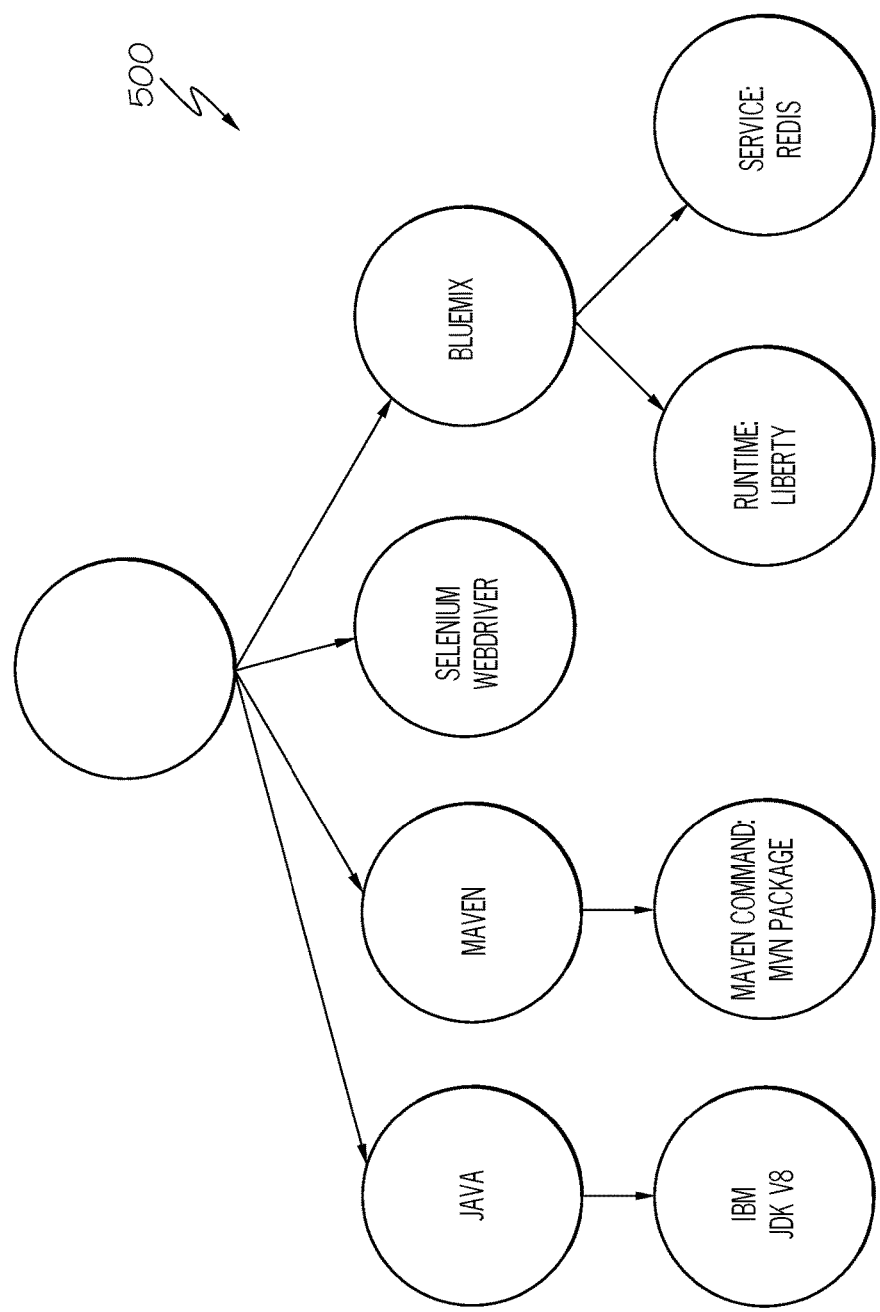
FIG. 5 illustrates one example of a DevOps pipeline Requirement Tree, in accordance with an embodiment of the present invention.

Turning to FIG. 5, shown is an example of the tree 500: it denotes that this project is written in java and need to compiled by IBM JDK V8, it will use Maven as the build tool and build by the command "mvn package", it will be tested by the test tool Selenium Webdriver and will be deployed to IBM Bluemix and running in a WAS Liberty runtime and bind with a Redis service.

In order to evaluate the similarity of the different DevOps pipeline requirement trees, we leverage a Kernel Method, in this method, a kernel function is defined to compute the similarity:

$$K_{tree}(T_1,T_2)=K_{string}(\text{string}(T_1),\text{string}(T_2))=K_{string}(S_1,S_2)=\Sigma_{s\in F}\text{num}_s(S_1)\text{num}_s(S_2)w_s$$

Where

K represents the kernel function to compute the similarity between tree $T_1$ and $T_2$ $T_1$ represents one requirement tree.

$T_2$ represents the other tree.

$S_1$=string($T_1$) is the string representation of tree $T_1$.

$S_2$=string($T_2$) is the string representation of tree $T_2$.

$\text{num}_s(S_1)$ represents the number of occurrences of a substring s in a string $S_1$.

$\text{num}_s(S_2)$ represents the number of occurrences of a substring s in a string $S_2$.

Where F is the set of substrings that occur in both $S_1$ and $S_2$, and the parameter $w_s$ serves as a weight parameter (for example, to emphasize important substrings).

How to convert a tree T into its string representation S:

Let T denote one of the target tree, and label($n_s$) is the string label of node $n_s$ in T. tag($n_s$) denotes the string representation of the subtree of T rooted at $n_s$. So if $n_{root}$ is the root node of T, tag($n_{root}$) is the string representation of the entire tree T. Next, let string(T)=tag($n_{root}$) denote the string representation of T. We will recursively apply the following steps in a bottom-up fashion to obtain string(T):

If the node $n_s$ is a leaf, let tag($n_s$)="["+ label($n_s$)+"]" (where + here is the string concatenation operator).

If the node$_{ns}$ is not a leaf and has c children $n_1, n_2, \ldots, n_c$, sort tag($n_1$), tag($n_2$), ..., tag($n_c$) in lexical order to obtain tag($n_1$*), tag($n_2$*), . . . , tag($n_c$*), and let tag($n_s$)="["+ label($n_s$)+ tag($n_1$*)+ tag($n_2$*)+ . . . + tag($n_c$*)+"]".

In step 344 a tree kernel similarity algorithm with a specified similarity function is used to create a feature map. This feature map creates similarity between the new pipeline requirement with the preexisting pipeline requirements. The similarity function can be specified in step 366.

In step 346, is mapping between the first code tree structures with steps and code snippets for the preexisting code with new pipeline requirements. A pipeline recommendation 372 is produced based on this mapping in step 370. Otherwise, the decision tree 368 is returned if the similarity is too small. The output is sent to the user.

Figure 6:
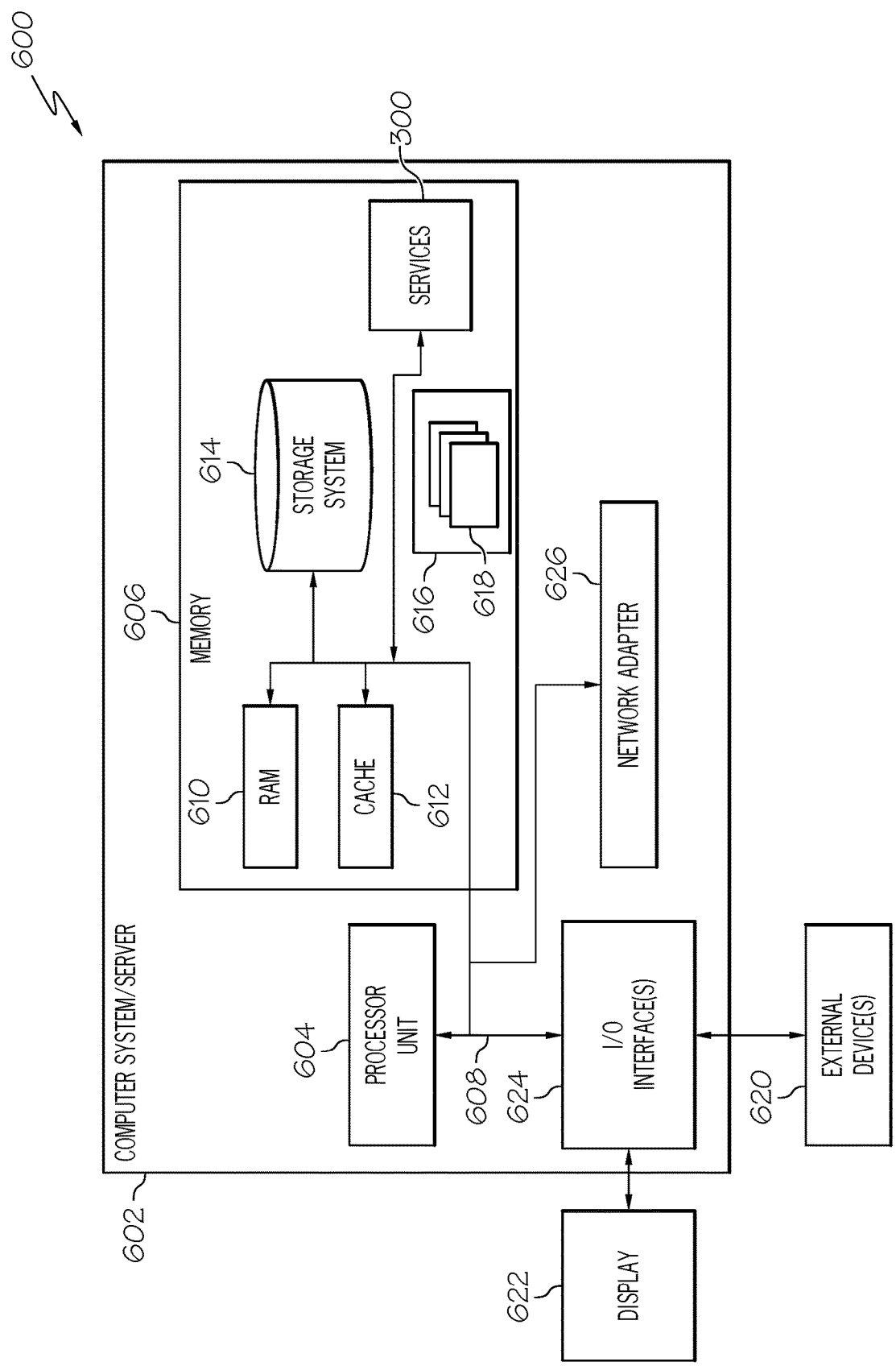
FIG. 6 illustrates one example of a cloud computing node, in accordance with an embodiment of the present invention.

FIG. 6 illustrates one example of a processing node 600 for a computing platform, in accordance with an embodiment the present invention. This example is not intended to suggest any limitation as to the scope of use or functionality of embodiments of the invention described herein and the processing node 600 is capable of being implemented and/or performing anyone or more of the functionalities set forth herein.

As depicted, processing node 600 can be a computer system/server 602, which is operational with numerous other general purpose or special purpose computing system environments or requirements. Examples of well-known computing systems, environments, and/or requirements that may be suitable for use with computer system/server 602 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 602 may be described in the general context of computer system-executable instructions, such as program modules as further described below, being executed by a computer system. Generally, program modules may include routines, programs, objects, components, logic, data structures, and so on that perform particular tasks or implement particular abstract data types. Computer system/server 602 may be practiced as one node of a distributed cloud computing environment, an example of which will be described with reference to FIG. 6. In such cloud computing environments, tasks are performed by remote processing devices that are linked through a communications network. In a distributed cloud computing environment, program modules 618 may be stored in one or more local and remote computer system storage media, including memory storage devices.

As shown in FIG. 6, computer system/server 602 in cloud computing node 600 is shown in the form of a general-purpose computing device. The components of computer system/server 602 may include, but are not limited to, one or more processors or processing units 604, a system memory 606, and a bus 608 that couples various system components including system memory 606 to processor 604.

Bus 608 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 602 typically includes a variety of computer system readable media. Such media may be any available media that is accessible by computer system/server 602, and it includes both volatile and non-volatile media, removable and non-removable media.

System memory 606, in one embodiment, implements the functions of FIG. 2 and the processes described with reference to FIG. 3. The system memory 606 can include computer readable media in the form of volatile memory, such as random access memory (RAM) 610 and/or cache memory 612. Computer system/server 602 may further include other removable/non-removable, volatile/non-volatile computer system storage media. By way of example only, storage system 614 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 608 by one or more data media interfaces. As will be further depicted and described below, memory 606 may include at least one computer program product having a set (e.g., at least one) of program modules 618 stored that are configured to carry out functions of various embodiments of the invention.

Program/utility 616, having a set (at least one) of program modules 618, may be stored in memory 606 by way of example, and not limitation, as well as an operating system, one or more application programs, other program modules, and program data, such as services 300 described above with reference to FIGS. 1 and 2. Each of the operating system, one or more application programs, other program modules, and program data or some combination thereof, may be adapted to a networking environment. In some embodiments, program modules 618 carry out the functions and/or methodologies of various embodiments of the invention described herein.

With reference again to FIG. 6, computer system/server 602 may also communicate with one or more external devices 620 such as a keyboard, a pointing device, a display 622, etc. Such external devices 620 include one or more devices that enable a user to interact with computer system/server 602; and/or any devices (e.g., network card, modem, etc.) that enable computer system/server 602 to communicate with one or more other computing devices. Such communication/interaction can occur via I/O interfaces 624. In some embodiments, computer system/server 602 can communicate with one or more networks such as a local area network (LAN), a general wide area network (WAN), and/or a public network (e.g., the Internet) via network adapter 626. As depicted, network adapter 626 communicates with the other components of computer system/server 602 via bus 608. It should be understood that although not shown, other hardware and/or software components could be used in conjunction with computer system/server 602. Examples, include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

Figure 7:
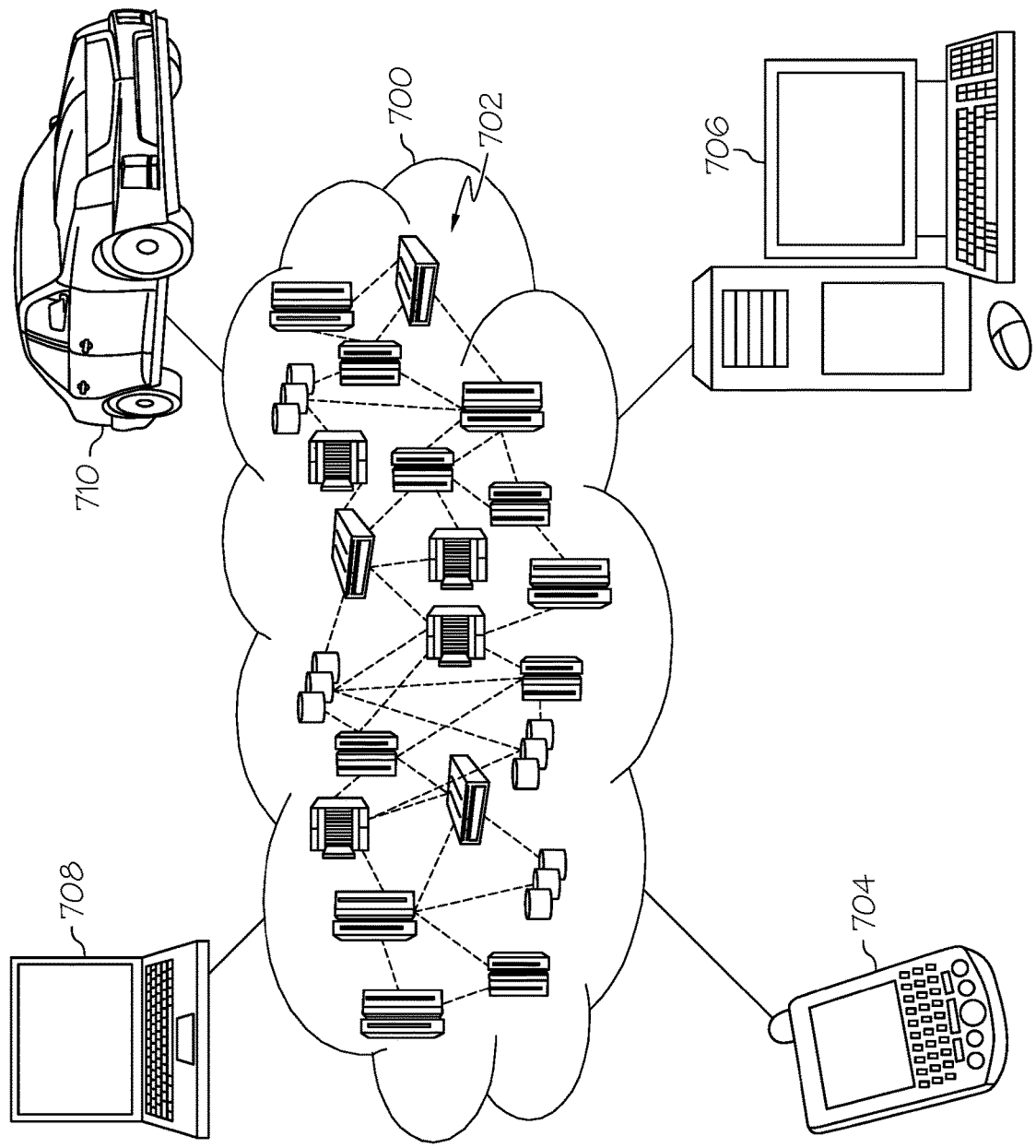
FIG. 7 illustrates one example of a cloud computing environment, in accordance with an embodiment of the present invention.

Referring now to FIG. 7, illustrative cloud computing environment 700 is depicted. As shown, cloud computing environment 700 comprises one or more cloud computing nodes 702 with which local computing devices used by cloud consumers, such as, for example, personal digital assistant (PDA) or cellular telephone 704, desktop computer 706, laptop computer 708, and/or automobile computer system 710 may communicate. Nodes 702 may communicate with one another. They may be grouped (not shown) physically or virtually, in one or more networks, such as Private, Community, Public, or Hybrid clouds as described hereinabove, or a combination thereof. This allows cloud computing environment 700 to offer infrastructure, platforms and/or software as services for which a cloud consumer does not need to maintain resources on a local computing device. It is understood that the types of computing devices 704, 706, 708, 710 shown in FIG. 7 are intended to be illustrative only and that computing nodes 702 and cloud computing environment 700 can communicate with any type of computerized device over any type of network and/or network addressable connection (e.g., using a web browser).

Figure 8:
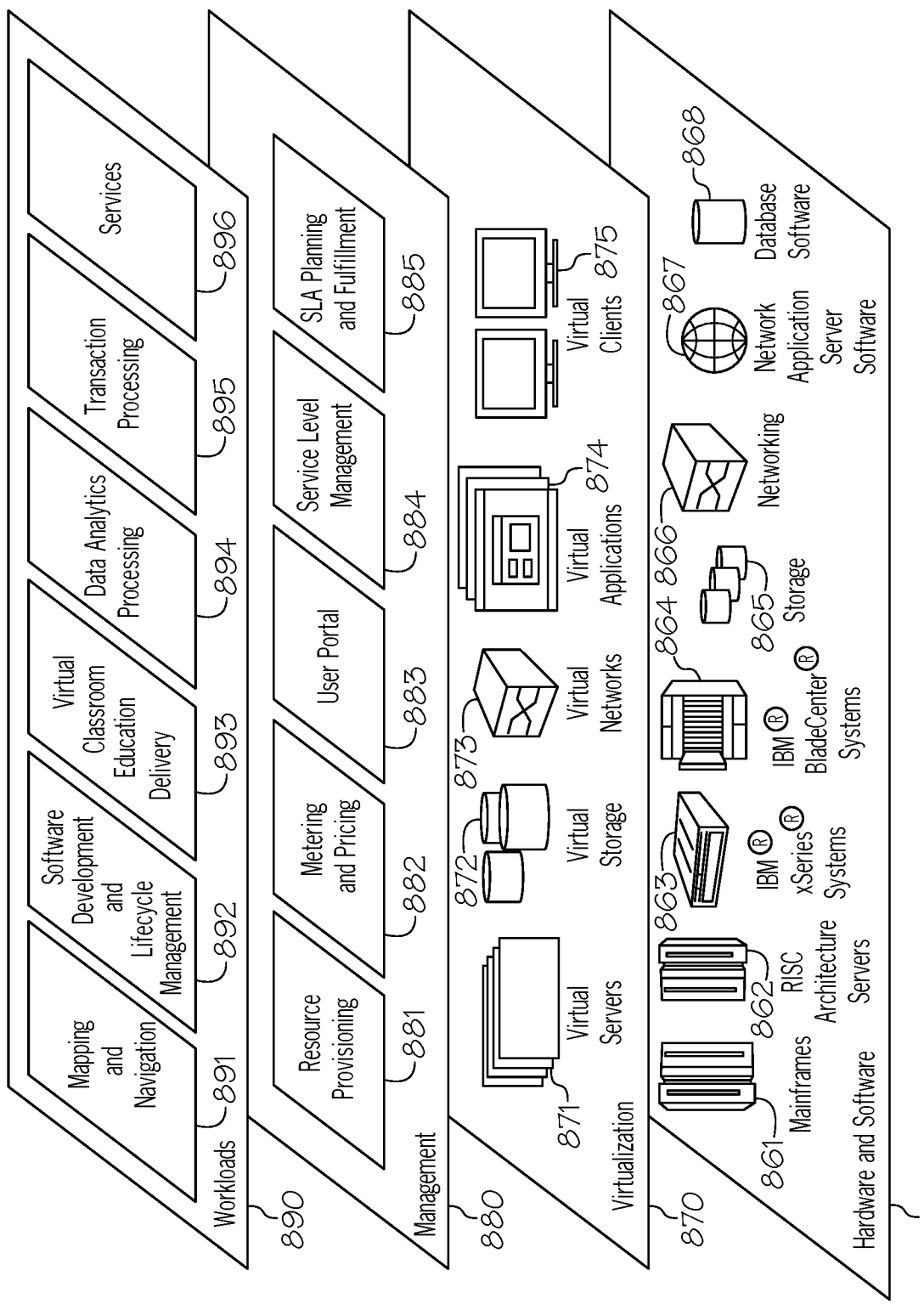
FIG. 8 illustrates abstraction model layers, in accordance with an embodiment of the present invention.

Referring now to FIG. 8, an exemplary set of functional abstraction layers provided by cloud computing environment 700 is shown. It is understood in that the components, layers, and functions shown in FIG. 8 are illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; network application server 867 and networks and networking components 866. In some embodiments, software components include network application server software 868 and database software 868.

Virtualization layer 870 provides an abstraction layer from which the following examples of virtual entities may be provided: virtual servers 871; virtual storage 872; virtual networks 873, including virtual private networks; virtual applications 874 and operating systems 884; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and 896 for delivering services to develop software collaboratively in accordance with embodiments of the present invention.

The description of the present application has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method
for developing software collaboratively, the method comprising:
    accessing at least one repository of code for a plurality of preexisting software applications;
    extracting a plurality of first code tree structures and one or more project features from at least two of the plurality of preexisting software applications, the project features including one or more of a program language, a build tool, and a testing tool, from the repository of code which represent a plurality of preexisting pipeline requirements in a text string format as input to a tree kernel similarity algorithm, each of the first code tree structures is an ordered, rooted tree representing a structure of one of the plurality of preexisting software applications;
    accessing at least one development repository of code for a plurality of new software applications;
    extracting a plurality of second code tree structures and the one or more project features from at least two of the plurality of new software applications, the development repository of code which represent a plurality of new pipeline requirements in a text string format as input to the tree kernel similarity algorithm, each of the second code tree structure is an ordered, rooted tree representing a structure of one of the plurality of new software applications;
    converting each of the plurality of second code tree structures into a text string format by recursively apply the following in a bottom-up fashion to obtain string(T):
        in response to a node $n_s$ is a leaf, set tag($n_s$)="["+ label($n_s$)+"]", where + is a string concatenation operator; and
        in response to the node $n_s$ is not a leaf and has c children $n_1$, $n_2$, ..., $n_c$, sort tag($n_1$), tag($n_2$), ..., tag($n_c$) in lexical order to produce tag($n_1^*$), tag($n_2^*$), ..., tag($n_c^*$), and let tag($n_s$)="["+label($n_s$)+ tag($n_1^*$)+ tag($n_2^*$)+ ... + tag($n_c^*$)+"]" set,
    where T is a target tree, and label($n_s$) is a string label of node $n_s$ in T. tag($n_s$) is a string representation of a subtree of T rooted at $n_s$, in which $n_{root}$ is a root node of T, tag($n_{root}$) is a string representation of an entire tree T and string(T)=tag($n_{root}$) is a string representation of T;
    using a tree kernel similarity algorithm, between each of the first code tree structures and each of the second code tree structures, for using a specified similarity function to create a feature map between the plurality of new pipeline requirements with the plurality of preexisting pipeline requirements;
    clustering one or more features of the new pipe line requirements;
    extracting different requirements to different definitions based upon the one or more features that have been clustered; and selecting a preexisting pipeline requirement from among the plurality of preexisting pipeline requirements for the feature map with a highest similarity of features as the new pipeline requirement.

2. The computer-implemented method of claim 1, wherein the extracting a first code tree structure from the repository of code which represent preexisting pipeline requirements to be used with a tree kernel similarity algorithm and extracting a second code tree structure from the development repository of code which represent the new pipeline requirements to be used with a tree kernel similarity algorithm includes a language type extractor.

3. The computer-implemented method of claim 1, wherein the extracting a first code tree structure from the repository of code which represent preexisting pipeline requirements to be used with a tree kernel similarity algorithm and extracting a second code tree structure from the development repository of code which represent the new pipeline requirements to be used with a tree kernel similarity algorithm includes a build tool extractor.

4. The computer-implemented method of claim 1, wherein the extracting a first code tree structure from the repository of code which represent preexisting pipeline requirements to be used with a tree kernel similarity algorithm and extracting a second code tree structure from the development repository of code which represent the new pipeline requirements to be used with a tree kernel similarity algorithm includes a deployment environment extractor.

5. The computer-implemented method of claim 1, wherein the extracting a first code tree structure from the repository of code which represent preexisting pipeline requirements to be used with a tree kernel similarity algorithm and extracting a second code tree structure from the development repository of code which represent the new pipeline requirements to be used with a tree kernel similarity algorithm includes a test tool extractor.

6. The computer-implemented method of claim 1, wherein the extracting a first code tree structure from the repository of code which represent preexisting pipeline requirements to be used with a tree kernel similarity algorithm and extracting a second code tree structure from the development repository of code which represent the new pipeline requirements to be used with a tree kernel similarity algorithm includes at least two of a language type extractor, a build tool extractor, a deployment environment extractor, and a test tool extractor.

7. The computer-implemented method of claim 1, wherein the extracting a first code tree structure from the repository of code which represent preexisting pipeline requirements to be used with a tree kernel similarity algorithm includes extracting code tree structure from the repository of code which represent preexisting pipeline requirement and a period time basis.

8. The computer-implemented method of claim 1, wherein the extracting a first code tree structure from the repository of code which represent preexisting pipeline requirements to be used with a tree kernel similarity algorithm includes extracting code tree structure from the repository of code which represent preexisting pipeline requirement in response to a new code for software applications being made available.

9. A system for developing software collaboratively, comprising:
    a memory;
    a processor communicatively coupled to the memory, where the processor is configured to perform:
        accessing at least one repository of code for a plurality of preexisting software applications;
        extracting a plurality of first code tree structures and one or more project features from at least two of the plurality of preexisting software applications, the project features including one or more of a program language, a build tool, and a testing tool, from the repository of code which represent a plurality of preexisting pipeline requirements in a text string format as input to a tree kernel similarity algorithm, each of the first code tree structures is an ordered, rooted tree representing a structure of one of the plurality of preexisting software applications;
        accessing at least one development repository of code for a plurality of new software applications;
        extracting a plurality of second code tree structures and the one or more project features from at least two of the plurality of new software applications, the development repository of code which represent a plurality of new pipeline requirements in a text string format as input to the tree kernel similarity algorithm, each of the second code tree structure is an ordered, rooted tree representing a structure of one of the plurality of new software applications;
        converting each of the plurality of second code tree structures into a text string format by recursively apply the following in a bottom-up fashion to obtain string (T):
            in response to a node $n_s$ is a leaf, set tag($n_s$)="["+ label($n_s$)+"]", where + is a string concatenation operator; and
            in response to the node $n_s$ is not a leaf and has c children $n_1, n_2, \ldots, n_c$, sort tag($n_1$), tag($n_2$), $\ldots$, tag($n_c$) in lexical order to produce tag($n_1$*), tag($n_2$*), $\ldots$, tag($n_c$*), and let tag($n_s$)="["+label($n_s$)+ tag($n_1$*)+ tag ($n_2$*)+ $\ldots$ + tag($n_c$*)+"]" set,
        where T is a target tree, and label($n_s$) is a string label of node $n_s$ in T. tag($n_s$) is a string representation of a subtree of T rooted at $n_s$, in which $n_{root}$ is a root node of T, tag($n_{root}$) is a string representation of an entire tree T and string(T)=tag ($n_{root}$) is a string representation of T;
        using a tree kernel similarity algorithm, between each of the first code tree structures and each of the second code tree structures, for using a specified similarity function to create a feature map between the plurality of new pipeline requirements with the plurality of preexisting pipeline requirements;
        clustering one or more features of the new pipe line requirements;
        extracting different requirements to different definitions based upon the one or more features that have been clustered; and
        selecting a preexisting pipeline requirement from among the plurality of preexisting pipeline requirements for the feature map with a highest similarity of features as the new pipeline requirement.

10. The system of claim 9, wherein the extracting a first code tree structure from the repository of code which represent preexisting pipeline requirements to be used with a tree kernel similarity algorithm and extracting a second code tree structure from the development repository of code which represent the new pipeline requirements to be used with a tree kernel similarity algorithm includes a language type extractor.

11. The system of claim 9, wherein the extracting a first code tree structure from the repository of code which represent preexisting pipeline requirements to be used with a tree kernel similarity algorithm and extracting a second code tree structure from the development repository of code which represent the new pipeline requirements to be used with a tree kernel similarity algorithm includes a build tool extractor.

12. The system of claim 9, wherein the extracting a first code tree structure from the repository of code which represent preexisting pipeline requirements to be used with a tree kernel similarity algorithm and extracting a second code tree structure from the development repository of code which represent the new pipeline requirements to be used with a tree kernel similarity algorithm includes a deployment environment extractor.

13. The system of claim 9, wherein the extracting a first code tree structure from the repository of code which represent preexisting pipeline requirements to be used with a tree kernel similarity algorithm and extracting a second code tree structure from the development repository of code which represent the new pipeline requirements to be used with a tree kernel similarity algorithm includes a test tool extractor.

14. The system of claim 9, wherein the extracting a first code tree structure from the repository of code which represent preexisting pipeline requirements to be used with a tree kernel similarity algorithm and extracting a second code tree structure from the development repository of code which represent the new pipeline requirements to be used with a tree kernel similarity algorithm includes at least two of a language type extractor, a build tool extractor, a deployment environment extractor, and a test tool extractor.

15. The system of claim 9, wherein the extracting a first code tree structure from the repository of code which represent preexisting pipeline requirements to be used with a tree kernel similarity algorithm includes extracting code tree structure from the repository of code which represent preexisting pipeline requirement and a period time basis.

16. The system of claim 9, wherein the extracting a first code tree structure from the repository of code which represent preexisting pipeline requirements to be used with a tree kernel similarity algorithm includes extracting code tree structure from the repository of code which represent preexisting pipeline requirement in response to a new code for software applications being made available.

17. A non-transitory computer program product of for developing software collaboratively, comprising a computer readable storage medium having computer readable program instructions embodied therewith, the computer readable program instructions when executed by a processor causes the processor to perform the steps of:

accessing at least one repository of code for a plurality of preexisting software applications;

extracting a plurality of first code tree structures and one or more project features from at least two of the plurality of preexisting software applications, the project features including one or more of a program language, a build tool, and a testing tool, from the repository of code which represent a plurality of preexisting pipeline requirements in a text string format as input to a tree kernel similarity algorithm, each of the first code tree structures is an ordered, rooted tree representing a structure of one of the plurality of preexisting software applications;

accessing at least one development repository of code for a plurality of new software applications;

extracting a plurality of second code tree structures and the one or more project features from at least two of the plurality of new software applications, the development repository of code which represent a plurality of new pipeline requirements in a text string format as input to the tree kernel similarity algorithm, each of the second code tree structure is an ordered, rooted tree representing a structure of one of the plurality of new software applications;

converting each of the plurality of second code tree structures into a text string format by recursively apply the following in a bottom-up fashion to obtain string (T):

in response to a node $n_s$ is a leaf, set tag($n_s$)="["+ label($n_s$)+"]", where + is a string concatenation operator; and in response to the node $n_s$ is not a leaf and has c children $n_1, n_2, \ldots, n_c$, sort tag($n_1$), tag($n_2$), ..., tag($n_c$) in lexical order to produce tag($n_1$*), tag($n_2$*), ..., tag($n_c$*), and let tag($n_s$)="["+ label($n_s$)+ tag($n_1$*)+ tag($n_2$*)+ ... + tag($n_c$*)+"]" set, where T is a target tree, and label($n_s$) is a string label of node $n_s$ in T. tag($n_s$) is a string representation of a subtree of T rooted at $n_s$, in which $n_{root}$ is a root node of T, tag($n_{root}$) is a string representation of an entire tree T and string(T)=tag ($n_{root}$) is a string representation of T;

using a tree kernel similarity algorithm, between each of the first code tree structures and each of the second code tree structures, for using a specified similarity function to create a feature map between the plurality of new pipeline requirements with the plurality of preexisting pipeline requirements;

clustering one or more features of the new pipe line requirements;

extracting different requirements to different definitions based upon the one or more features that have been clustered; and selecting a preexisting pipeline requirement from among the plurality of preexisting pipeline requirements for the feature map with a highest similarity of features as the new pipeline requirement.

18. The computer program product of claim 17, wherein the extracting a first code tree structure from the repository of code which represent preexisting pipeline requirements to be used with a tree kernel similarity algorithm and extracting a second code tree structure from the development repository of code which represent the new pipeline requirements to be used with a tree kernel similarity algorithm includes a language type extractor.

19. The computer program product of claim 17, wherein the extracting a first code tree structure from the repository of code which represent preexisting pipeline requirements to be used with a tree kernel similarity algorithm and extracting a second code tree structure from the development repository of code which represent the new pipeline requirements to be used with a tree kernel similarity algorithm includes a build tool extractor.

20. The computer program product of claim 17, wherein the extracting a first code tree structure from the repository of code which represent preexisting pipeline requirements to be used with a tree kernel similarity algorithm and extracting a second code tree structure from the development repository of code which represent the new pipeline requirements to be used with a tree kernel similarity algorithm includes a deployment environment extractor.

* * * * *